H. R. EWING.
MOVING PICTURE FILM.
APPLICATION FILED DEC. 26, 1919.

1,334,948.

Patented Mar. 30, 1920.

Inventor:
Henry R. Ewing
by attorneys

UNITED STATES PATENT OFFICE.

HENRY R. EWING, OF BROOKLYN, NEW YORK.

MOVING-PICTURE FILM.

1,334,948.

Specification of Letters Patent.

Patented Mar. 30, 1920.

Application filed December 26, 1919. Serial No. 347,508.

*To all whom it may concern:*

Be it known that I, HENRY R. EWING, a citizen of the United States, and resident of the borough of Brooklyn, in the city and State of New York, have invented a new and useful Improvement in Moving - Picture Films, of which the following is a specification.

The object of my invention is to provide means whereby breaks, tears or the removal of a portion of the film can be readily detected by an electrical measuring instrument applied to the film, without the necessity of unwinding the film. My invention consists broadly in providing the film with an electric conducting element such for instance, as a very fine copper wire having its free ends exposed, whereby a suitable electrical measuring instrument may be connected thereto for indicating whether the wire has been broken or shortened.

My invention more particularly comprises a film having an extremely fine electric conducting return wire embedded therein along the side edges and inner end of the film with the free ends of the wire exposed at the outer end of the film.

Figure 1:
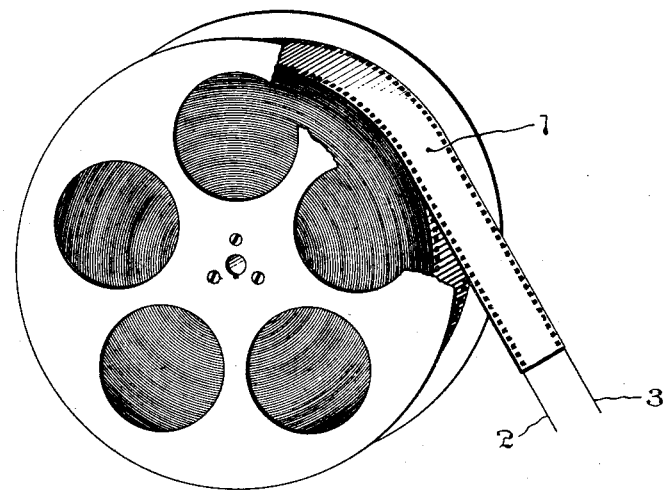
Figure 2:
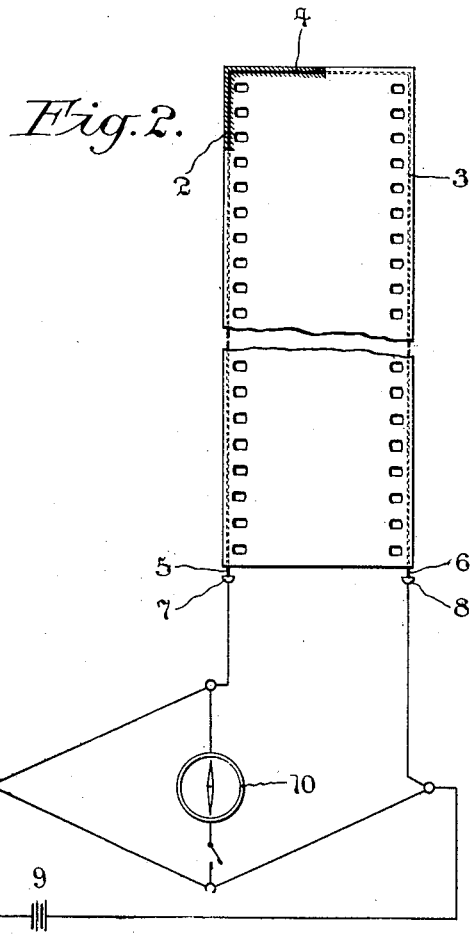

A practical embodiment of my invention is represented in the accompanying drawing, in which Figure 1 represents in perspective a moving picture film roll with my invention applied thereto, and Fig. 2 represents the inner and outer ends of the film in plan with an electrical measuring instrument represented diagrammatically, applied to the exposed free ends of the electric conducting wire.

The film is denoted by 1 and the portions of the continuous electric conducting wire which are embedded along the side edges of the film are denoted by 2 and 3 respectively. The portion of the wire which extends across the inner end of the film is denoted by 4. The exposed free ends of the wire are denoted by 5 and 6.

The electrical measuring instrument which may be a Wheatstone bridge is represented diagrammatically, the terminals being denoted by 7 and 8, the battery by 9 and the galvanometer by 10.

The usual commercial practice in handling films is to deliver the film roll to the customer and when the customer returns the film roll it is unwound and examined for "breaks", "tears" or "cut-outs".

This is a very tedious, trying and expensive method, and necessitates an additional handling of the film and consequent wear thereof.

In my improved film, the resistance measuring instrument is connected to the free ends of the electric conducting wire and the resistance is recorded before the film is delivered to the customer. When the customer returns the film, the instrument is again connected to the free ends of the wire and if the resistance indicated by the instrument is the same as before delivery, the film roll will not have to be unwound to be examined for "tears", "breaks" and "cut-outs". If, however, no current is indicated, the dealer knows that there is a "break", "tear", or "cut-out" and the film roll may be unwound and examined therefor.

If the instrument indicates a different resistance than previously recorded, then the dealer knows that there has been some tampering with the film, such for instance, as a portion of the film removed and the remaining wire again electrically connected.

It will thus be seen that the condition of the film with respect to its previous condition may be instantly determined without unwinding the film, thus saving the undue handling of the film and the loss of time where the instrument indicates the same condition of the film on its return as when it was delivered.

It is evident that various changes might be resorted to in the form and arrangement of the electric conducting element without departing from the spirit and scope of my invention; hence I do not wish to limit myself to the particular embodiment herein shown, but

What I claim is:

1. A moving picture film including an electric conducting wire extending along the film, the free ends of the wire being exposed for the application of an electrical measuring instrument, whereby the condition of the film with respect to its previous condition may be determined without unwinding the film.

2. A moving picture film including an electric conducting wire extending along the film and embedded therein, the free ends of the wire being exposed for the application of an electrical measuring instrument, whereby the condition of the film with respect to its previous condition may be determined without unwinding the film.

3. A moving picture film including an electric conducting return wire extending along the film, the free ends of the wire being exposed at the outer end of the film for the application of an electrical measuring instrument, whereby the condition of the film with respect to its previous condition may be determined without unwinding the film.

4. A moving picture film including an electric conducting return wire extending along the film and embedded therein, the free ends of the wire being exposed at the outer end of the film for the application of an electrical measuring instrument, whereby the condition of the film with respect to its previous condition may be determined without unwinding the film.

5. A moving picture film including an electric conducting return wire extending along the side edges and across the film at its inner end, the free ends of the wire being exposed at the outer end of the film for the application of an electrical measuring instrument, whereby the condition of the film with respect to its previous condition may be determined without unwinding the film.

6. A moving picture film including an electric return wire extending along the side edges of the film and across the film at its inner end and embedded therein, the free ends of the wire being exposed at the outer end of the film for the application of an electrical measuring instrument, whereby the condition of the film with respect to its previous condition may be determined without unwinding the film.

In testimony that I claim the foregoing as my invention, I have signed my name, this 22nd day of December, 1919.

HENRY R. EWING.